United States Patent
Wu et al.

(10) Patent No.: US 9,264,124 B2
(45) Date of Patent: Feb. 16, 2016

(54) ANTENNA POLARIZATION OPTIMIZATION FOR WIRELESS COMMUNICATIONS

(71) Applicants: Huan Wu, Ottawa (CA); Yan Xin, Kanata (CA); Shouxing Qu, Ottawa (CA); Arnold Sheynman, Northbrook, IL (US)

(72) Inventors: Huan Wu, Ottawa (CA); Yan Xin, Kanata (CA); Shouxing Qu, Ottawa (CA); Arnold Sheynman, Northbrook, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 32 days.

(21) Appl. No.: 13/871,047

(22) Filed: Apr. 26, 2013

(65) Prior Publication Data

US 2014/0321566 A1 Oct. 30, 2014

(51) Int. Cl.
| | |
|---|---|
| H04B 7/10 | (2006.01) |
| H04W 24/02 | (2009.01) |
| H04W 16/28 | (2009.01) |
| H04W 60/00 | (2009.01) |
| H04B 15/00 | (2006.01) |
| H04B 7/06 | (2006.01) |

(52) U.S. Cl.
CPC ........ *H04B 7/10* (2013.01); *H04B 7/061* (2013.01); *H04B 7/0665* (2013.01)

(58) Field of Classification Search
CPC ......... H04B 7/10; H04B 7/0665; H04B 7/061
USPC ............ 375/267, 260, 259, 220, 219; 455/73, 455/550.1, 561, 562.1, 226.3, 226.1, 130, 455/63.4, 63.1, 39, 67.12, 67.11; 342/367, 342/350
See application file for complete search history.

(56) References Cited

U.S. PATENT DOCUMENTS

| | | |
|---|---|---|
| 6,006,070 A | 12/1999 | Wong |
| 7,277,731 B2 | 10/2007 | Stratis et al. |
| 8,788,862 B1 * | 7/2014 | Vijayaraghavan et al. ... 713/323 |
| 2003/0083016 A1 | 5/2003 | Evans et al. |
| 2003/0199270 A1 | 10/2003 | Hamalainen et al. |
| 2006/0160489 A1 | 7/2006 | Hardacker |

(Continued)

FOREIGN PATENT DOCUMENTS

WO 0154230 A1 7/2001

OTHER PUBLICATIONS

"Antenna Models—Polarization"; retrieved on Mar. 1, 2013 from http://www.insight3d.com/resources/help/online/stk/index.html?page=source%2Fextfile%2Fcomm%Fcommradar03-02.htm; p. 1-2.

(Continued)

*Primary Examiner* — Chieh M Fan
*Assistant Examiner* — Michelle M Koeth
(74) *Attorney, Agent, or Firm* — Conley Rose, P.C.; J. Robert Brown, Jr.

(57) ABSTRACT

Embodiments are directed to providing communication between a first device and a second device by: iterating, by the first device, over a number of transmitter antenna polarization types in the first device, constructing, by the first device, a number of data units based on each of the transmitter antenna polarization types, transmitting, by the first device, each of the data units for each of a number of receiver antenna polarization types in the second device, receiving, by the first device, an indication of a transmitter antenna polarization type in the first device included in the number of transmitter antenna polarization types in the first device, and transmitting, by the first device, data using the indicated transmitter antenna polarization type.

22 Claims, 13 Drawing Sheets

(56) References Cited

U.S. PATENT DOCUMENTS

| | | | |
|---|---|---|---|
| 2009/0252140 A1* | 10/2009 | Imaeda | 370/342 |
| 2010/0144285 A1 | 6/2010 | Behzad et al. | |
| 2010/0190450 A1 | 7/2010 | Stirling-Gallacher et al. | |
| 2010/0216414 A1* | 8/2010 | Muterspaugh | H04B 7/01 455/83 |
| 2010/0297962 A1* | 11/2010 | Rofougaran | 455/88 |
| 2010/0303096 A1* | 12/2010 | Kasher et al. | 370/474 |
| 2011/0249576 A1* | 10/2011 | Chrisikos et al. | 370/252 |
| 2013/0095874 A1* | 4/2013 | Moshfeghi | 455/509 |

OTHER PUBLICATIONS

Alexis Paolo Garcia Ariza, et al "Dual-Polarized Architecture for Channel Sounding at 60 GHz with Digital/Analog Phase Control based on 0.25µm SiGe BiCMOS and LTCC Technology," Proceedings of the 5th European Conference on Antennas and Propagation (EUCAP), Apr. 2011, pp. 1454-1458.

European Patent Office, Search Report, Application No. 13165526.8, 6 pages.

Kyritsi, Persefoni, et al.; "Effect of Antenna Polarization on the Capacity of a Multiple Element System in an Indoor Environment"; IEEE Journal on Selected Areas in Communications; vol. 20, No. 6; p. 1227-1239; Aug. 2002.

W. C.-Y. Lee and Y. S. Yeh, "Polarization Diversity System for Mobile Radio," IEEE Trans. Com. vol. 20, No. 5, Oct. 1972, pp. 912-923.

Linh, Tran Thuc, et al.; "Design a Decoupled Receiver with One Dual-Polarized Antenna to Cancel CCI for GSM Network"; 15th International Conference on Advanced Communication Technology; p. 1-4; 2013.

A. Maltsev, et al, "Impact of Polarization Characteristics on 60-GHz Indoor Radio Communication Systems," IEEE Antennas and Wireless Propagation Letters, vol. 9, 2010, pp. 413-416.

T. Manabe, et al, "Polarization Dependence of Multipath Propagation and High-Speed Transmission Characteristics of Indoor Millimeter-Wave Channel at 60 GHz," IEEE Trans. VT-44, No. 2, 1995; pp. 268-274.

Radio-Electronics.com; "Antenna Polarisation or Polarization"; retrieved on Mar. 1, 2013 from http://www.radio-electronics.com/info/antennas/basics/polarisation-polarization.php; p. 1-5.

Frank Wollenschläger, et al, :A Compact Dual-Polarized Wideband Patch Antenna Array for the Unlicensed 60 GHz Band, Proceedings of the 5th European Conference on Antennas and Propagation (EUCAP), Apr. 2011, pp. 1873-1877.

Ferhat Yildirim and Huaping Liu, •Directional MAC for 60 GHz using Polarization Diversity Extension (DMAC-PDX),• Proceedings of IEEE GLOBECOM 2007, pp. 4697-4701.

F. Yildirim, et al, "Polarization Effects for Indoor Wireless Communications at 60 GHz," IEEE Comm. Letter vol. 12, No. 9, 2008; pp. 660-662.

"Wireless LAN Medium Access Control (MAC) and Physical Layer (PHY) Specifications," IEEE P802.11ad/D5.0, Sep. 2011, pp. 1-601.

Maltsev et al, "Channel Models for 60 GHz WLAN Systems," IEEE doc. 802.11-09/0334r8, May 2010, pp. 1-152.

\* cited by examiner

ANTENNA POLARIZATION OPTIMIZATION FOR WIRELESS COMMUNICATIONS

BACKGROUND

For electromagnetic (EM) waves, polarization is normally used to describe the oscillating orientation of the electric field. For transmit and receive antennas, polarization is used to identify the orientation of the electric field of the EM waves. It has been shown by experiments and measurements that the polarization characteristics of millimeter EM waves (mmWaves), such as those with a carrier frequency at 60 GHz and higher, is significantly different from that of those EM waves with carrier frequencies below 6 GHz. One of the differences is that the mmWaves and even their reflections may remain strongly polarized during the propagation. As a result, the received signal may be strongly discriminated in terms of polarization by the antenna at the receiver and the antenna polarization may have a significant impact on the link budget of any mmWave communication systems.

The link loss due to the polarization characteristics of antennas and a propagation channel may result from sources in two categories. The first category is a polarization mismatch loss (PML) in power that occurs at the receiver's antenna, due to the polarization mismatch between the incident EM wave and the receiving antenna. The PML is dependent on the polarization characteristics of both transmitter (TX) and receiver (RX) antennas and the propagation environment, i.e., line-of-sight (LOS) or non-line-of-sight (NLOS) reflections. In the case of NLOS, it is further dependent on reflection orders, reflecting medium and angles of reflections, i.e., angles of departure (AODs) at TX and angles of arrival (AOAs) at RX.

In addition to the power degradation from PML, the second source or category of loss is the receiver processing loss (RPL) in performance that occurs in the receiver processing function units such as timing and frequency synchronization, channel estimation, channel equalization, demodulation and decoding, etc. The RPL is due to the changes in the channel impulse response (CIR) profile including delay spread and power distribution, which is also caused by the polarization mismatch. Therefore, the RPL is dependent on the whole set of parameters causing PML as well as the factors related to the algorithms and implementations of the receiver.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
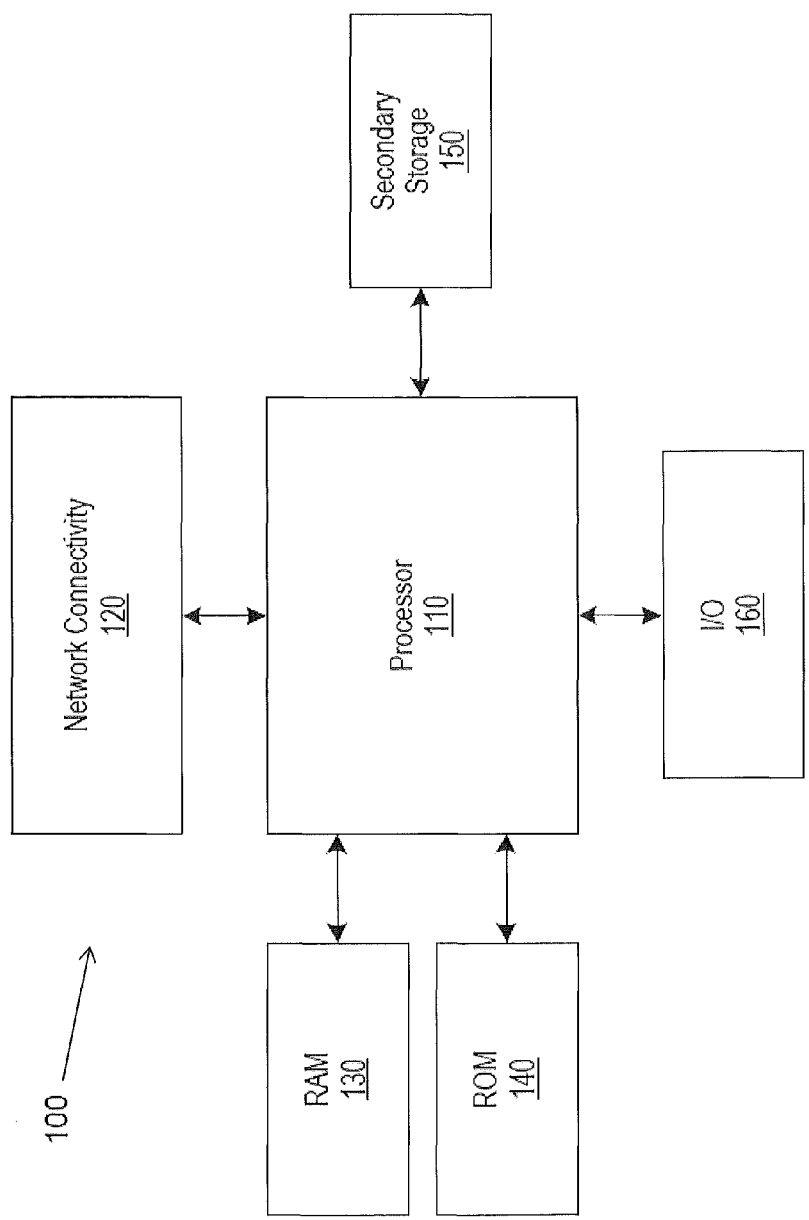
FIG. 1 depicts an exemplary system in which the present disclosure may be implemented.

The present disclosure is directed in general to communications systems and methods for operating the same.

Embodiments are directed to a method for providing communication between a first device and a second device, the method comprising: iterating, by the first device, over a number of transmitter antenna polarization types in the first device, constructing, by the first device, a number of data units based on each of the transmitter antenna polarization types, transmitting, by the first device, each of the data units for each of a number of receiver antenna polarization types in the second device, receiving, by the first device, an indication of a transmitter antenna polarization type in the first device included in the number of transmitter antenna polarization types in the first device, and transmitting, by the first device, data using the indicated transmitter antenna polarization type.

Embodiments are directed to a device comprising: at least one processor, and memory having instructions stored thereon that, when executed by the at least one processor, cause the device to: iterate over a number of transmitter antenna polarization types in the device, construct a number of data units based on each of the transmitter antenna polarization types, transmit each of the data units for each of a number of receiver antenna polarization types in a second device, receive, from the second device, an indication of a transmitter antenna polarization type in the device included in the number of transmitter antenna polarization types in the device, and transmit data using the indicated transmitter antenna polarization type.

Embodiments are directed to a system comprising: a first device configured to transmit to a second device a plurality of data units based on a number of transmitter antenna polarization types in the first device and a number of receiver antenna polarization types in the second device, the second device is configured to receive the plurality of data units, select a transmitter antenna polarization type for the first device and a receiver antenna polarization type for the second device based on an evaluation of a performance of a communication link between the first device and the second device for each of the plurality of data units, and transmit an indication of the selected transmitter antenna polarization type for the first device to the first device.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable instruction sequence, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers (HLR), visited location registers (VLR), Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or alternatively, to devices that have similar capabilities that are not generally transportable, such as desktop computers, set-top boxes, or sensors. A network node, as used herein, generally includes all nodes with the exception of client nodes, server nodes and access nodes. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc.) access points, which provide corresponding cell and WLAN coverage areas. WiGig® and its equivalents in the greater than 50 GHz range are also examples of wireless broadband. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices. Small cells use low power network nodes, which may include femtocells, picocells or even microcells, for the enhancement and evolution of the advanced cellular networks.

In general, a coverage area of less than two kilometers typically corresponds to a microcell, 200 meters or less for a picocell, and on the order of 10 meters for a femtocell. The actual dimensions of the cell may depend on the radio frequency of operation, the radio propagation conditions and the density of communications traffic. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices (including radio, optical or infra-red signals), radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that are read during execution of the instructions. The secondary storage 150 is typically comprised of one or more disk drives, solid state drives, or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, track pads, voice recognizers, card readers, paper tape readers, printers, video monitors, or other well-known input/output devices.

Figure 2:
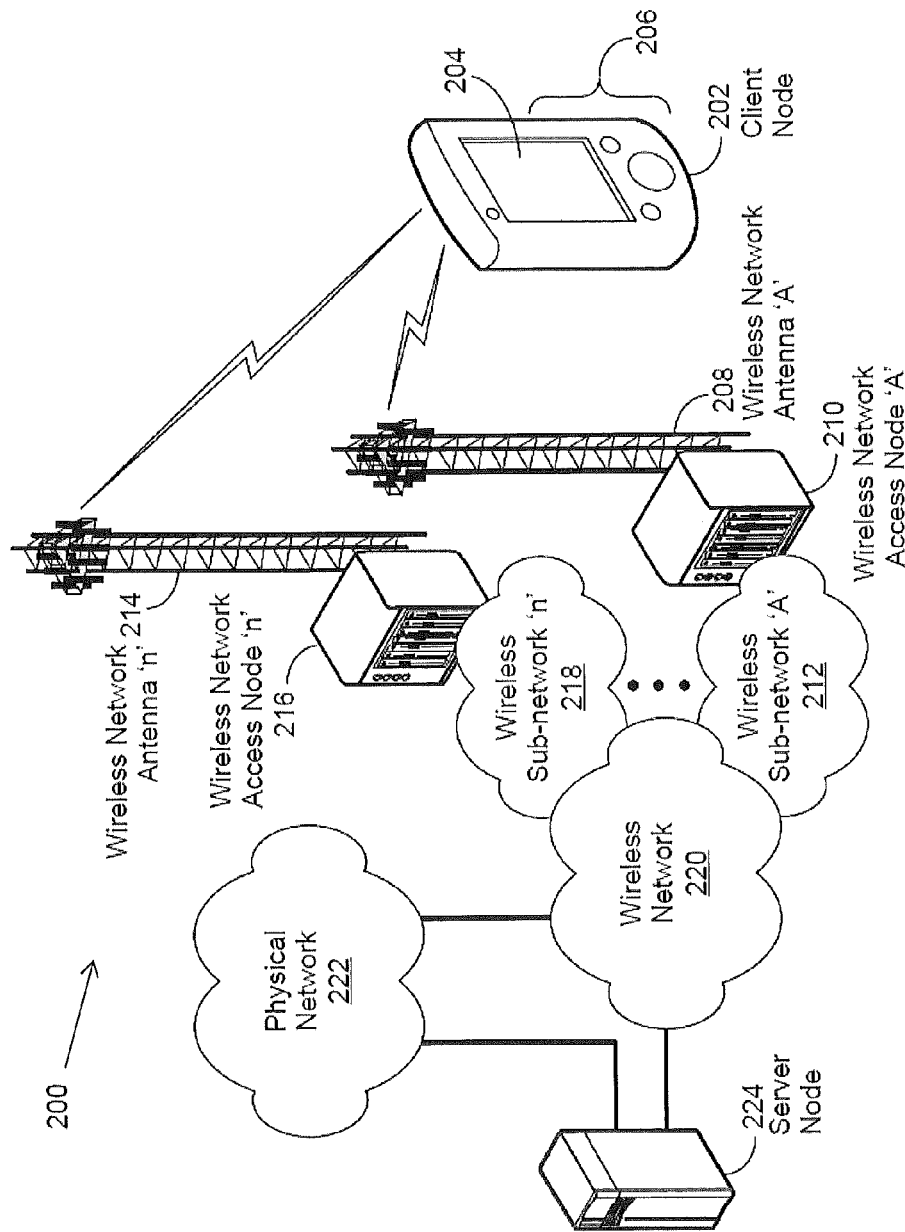
FIG. 2 shows a wireless-enabled communications environment including an embodiment of a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, DVORAK, AZERTY, and sequential keyboard types, or a traditional numeric keypad with alphabet letters associated with a telephone keypad. The input keys 206 may likewise include a trackwheel, an exit or escape key, a trackball, trackpad, touch sensitive input device and other navigational or functional keys, which may be moved to different positions, e.g., inwardly depressed, to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a core network 222, e.g., a global computer network such as the Internet. Via the wireless network 220 and the core network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless sub-network 212. Skilled practitioners of the art will recognize that many such embodiments are possible and the foregoing is not intended to limit the spirit, scope, or intention of the disclosure.

Figure 3:
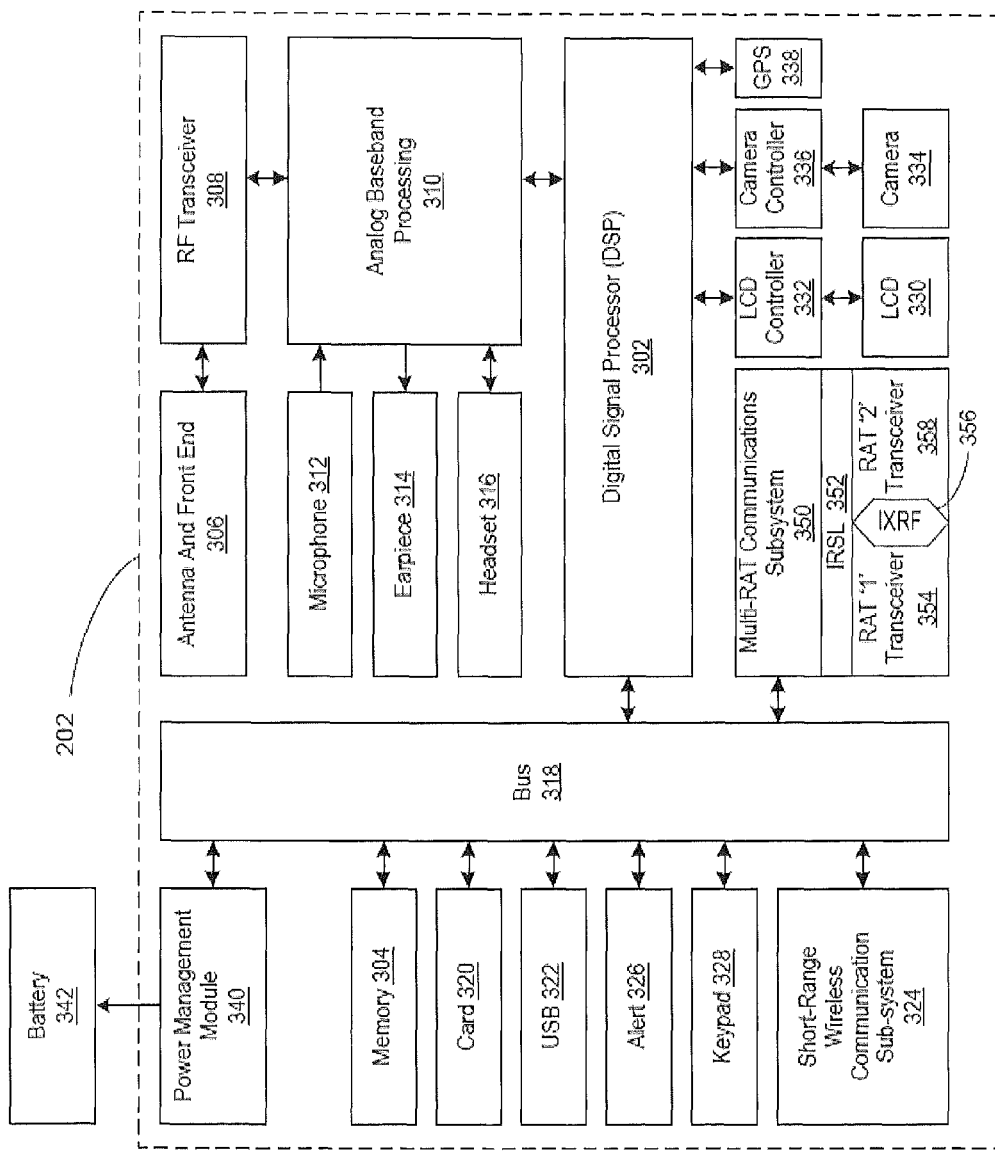
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface ("Bus") 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 306 may include multiple antennas to support beam forming and/or multiple input multiple output (MIMO) operations. As is known to those skilled in the art, MIMO operations may provide spatial diversity, which can be used to overcome difficult channel conditions or to increase data transmission throughput. Likewise, the antenna and front-end unit 306 may include antenna tuning or impedance matching components, RF power amplifiers, or low noise amplifiers. In another embodiment, the antenna and front end unit 306 may include control circuits for polarization selection and realization suitable for the disclosure.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as synchronization, channel estimation, equalization, modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 308, portions of the Antenna and Front End 306, and the analog base band processing unit 310 may be combined in one or more processing units and/or application specific integrated circuits (ASICs).

Note that in this diagram the radio access technology (RAT) RAT1 and RAT2 transceivers 354, 358, the IXRF 356, the IRSL 352 and Multi-RAT subsystem 350 are operably coupled to the RF transceiver 308 and analog baseband processing unit 310 and then also coupled to the antenna and front end 306 via the RF transceiver 308. As there may be multiple RAT transceivers, there will typically be multiple antennas or front ends 306 or RF transceivers 308, one for each RAT or band of operation.

The analog baseband processing unit 310 may provide various analog processing of inputs and outputs for the RF transceivers 308 and the speech interfaces (312, 314, 316). For example, the analog baseband processing unit 310 receives inputs from the microphone 312 and the headset 316 and provides outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform synchronization, channel estimation, equalization, modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302. The polarization optimization procedures of this disclosure along with other protocols may be implemented in the DSP 302 in conjunction with other transmitting and receiving functions such as channel estimation and equalization, modulation/demodulation and coding/decoding.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes. The short-range wireless communication Sub-system 324 may also include suitable RF Transceiver, Antenna and Front End subsystems.

The input/output interface ("Bus") 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface ("Bus") 318 to provide one mechanism for the user to make selections, enter information, and otherwise provide input to the client node 202. The keyboard 328 may be a full or reduced alphanumeric keyboard such as QWERTY, DVORAK, AZERTY and sequential types, or a traditional numeric keypad with alphabet letters associated with a telephone keypad. The input keys may likewise include a trackwheel, track pad, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to make digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. The GPS sensor 338 may be coupled to an antenna and front end (not shown) suitable for its band of operation. Various other peripherals may also be included to provide additional functions, such as radio and television reception.

In various embodiments, the client node (e.g., 202) comprises a first Radio Access Technology (RAT) transceiver 354 and a second RAT transceiver 358. As shown in FIG. 3, and described in greater detail herein, the RAT transceivers '1' 354 and '2' 358 are in turn coupled to a multi-RAT communications subsystem 350 by an Inter-RAT Supervisory Layer Module 352. In turn, the multi-RAT communications subsystem 350 is operably coupled to the Bus 318. Optionally, the respective radio protocol layers of the first Radio Access Technology (RAT) transceiver 354 and the second RAT transceiver 358 are operably coupled to one another through an Inter-RAT eXchange Function (IRXF) Module 356.

In various embodiments, the network node (e.g. 224) acting as a server comprises a first communication link corresponding to data to/from the first RAT and a second communication link corresponding to data to/from the second RAT.

Embodiments of the disclosure may also include a housing in which the components of FIG. 3 are secured. In an example, the antenna, which can be part of the antenna and front end 306, is positioned in the housing. The antenna might not be readily visible or distinguishable from the housing. One or more slots may be available in the housing to support the antenna. In an example, the antenna can be mostly positioned in the side of the housing. In an example, the antenna can be at least partially positioned in a trackpad, display, or touchscreen of a device (e.g., a mobile device).

In some embodiments, communications may take place at one or more frequencies, such as at 60 GHz (which may be divided into one or more channels or bands, such as a first channel between 57.24 GHz and 59.4 GHz, a second channel between 59.4 GHz and 61.56 GHz, a third channel between 61.56 GHz and 63.72 GHz, and a fourth channel between 63.72 GHz and 65.88 GHz). In some embodiments, an antenna may achieve communication in a range of 60 GHZ, +/−5 GHz or +/−6 GHz.

Embodiments of the disclosure are directed to one or more systems, apparatuses, devices, and methods for mitigating the impact of link and processing losses caused by transmitter (TX) and receiver (RX) antenna polarization mismatches in wireless communications. The mismatch may be caused due to the TX antenna polarization types and directional patterns being unknown to the RX antenna, the RX antenna polarization types and directional patterns being unknown to the TX antenna, and the radio propagation environment being uncertain and unpredictable to either the TX antenna or the RX antenna. In some embodiments, the best or optimal combination of the TX and RX polarization types, referred to as the optimum antenna polarization scheme (APS), can be found with best possible link performance in an unknown propagation environment and for a given set of TX and RX polarization types and directional patterns. The link performance can be measured at the RX by a single or multiple performance metrics and can be fed back to the TX. Some of the performance metrics include the maximization of the received signal powers (e.g., received signal strength indication (RSSI)), the maximization of the signal to noise ratios (SNRs) and the minimization of the bit error rates (BERs), etc.

In some embodiments, a polarization training may be used to optimize the polarization characteristics between a TX and a RX in a radio link. In some embodiments, the polarization training is based on a sequence of data units (DUs, e.g., MAC frames, PHY packets and training fields in a frame/packet) exchanged between two communication devices, a source device (SD) and a destination device (DD), in two directions, a forward link from the SD to the DD and a reverse link from the DD to the SD. In the polarization training for the forward link, the information of the antenna polarization type (APT) being used by the transmitter of the SD is embedded in each of the transmitted data units (TDUs) from the SD to the DD. The link performance is evaluated in the receiver of the DD by receiving each of the DUs using each of the APTs available for the receiver of the DD. The receiving here refers to any general or specialized procedures used in a wireless receiver including all or some of the functional units such as polarization configuration, beamforming, down-converting, digitization, synchronization, channel estimation, equalization, demodulation and decoding, etc. Link performance metrics (e.g., SNR, signal strength, BER, etc.) can be computed for each of the received data units (RDUs) by the receiving procedure. The best link performance associated with a specific antenna polarization scheme, called the optimum antenna polarization scheme, can be determined based on a single or a set of the best link performance metrics considered.

The information of the optimum APS for the forward link direction (APS-S2D) may be fed back to the SD when the polarization training takes place in the reverse link from the DD to the SD. The polarization training for the reverse link may be similar to that for the forward link. One or more of the TDUs from the DD to the SD may include the optimum APS-S2D information acquired from the forward link training and the information of the APT being used by the transmitter of the DD itself. Link performance may be evaluated with performance metrics computed in the receiver of the SD for each of the RDUs of all possible combinations of TX and RX APTs considered. The optimum APS for the reverse link from the DD to the SD direction (APS-D2S) may be determined by a single or a set of the performance metrics considered. The optimum APS-D2S can be fed back to the DD with a TDU using the optimum APS-S2D trained for the forward link.

To facilitate the description of the polarization training process, the following notations are used herein:

N_TxAntPolSD: the number of transmitter antenna polarization types in a source device;
N_RxAntPolSD: the number of receiver antenna polarization types in a source device;
N_TxAntPolDD: the number of transmitter antenna polarization types in a destination device;
N_RxAntPolDD: the number of receiver antenna polarization types in a destination device;
TxAntPolSD(k): the k-th transmitter antenna polarization type in a source device, k=1 ... N_TxAntPolSD;
RxAntPolSD(k): the k-th receiver antenna polarization type in a source device, k=1 ... N_RxAntPolSD;
TxAntPolDD(k): the k-th transmitter antenna polarization type in a destination device, k=1 ... N_TxAntPolDD; and
RxAntPolDD(k): the k-th receiver antenna polarization type in a destination device, k=1 ... N_RxAntPolDD.

An antenna polarization type (APT) can be any form describing the orientation of the electric field the antenna emits or is capable of receiving, e.g., a horizontal linear polarization (HLP), a vertical linear polarization (VLP), a left-hand circular polarization (LHCP), a right-hand circular polarization (RHCP), etc., potentially in any combination. The polarization optimization techniques described herein can apply to wireless communications systems with any transmit/receive antenna polarization types and with any transmit and receive antenna directional patterns (ADPs). An antenna polarization scheme (APS) may indicate a specific combination of the antenna polarization types used in a transmitter of Device A and a receiver of Device B which is communicating with Device A. For example, APS-S2D={HLP, RHCP} identifies that the HLP is used in the transmitter of the SD and the RHCP is used in the receiver of the DD.

Antenna polarization and directionality may be closely related. The following notations are used herein:

N_TxAntDirSD: the number of transmitter antenna directional patterns in a source device;
N_RxAntDirSD: the number of receiver antenna directional patterns in a source device;
N_TxAntDirDD: the number of transmitter antenna directional patterns in a destination device;
N_RxAntDirDD: the number of receiver antenna directional patterns in a destination device;
TxAntDirSD(k): the k-th transmitter antenna directional pattern in a source device, k=1 ... N_TxAntDirSD;
RxAntDirSD(k): the k-th receiver antenna directional pattern in a source device, k=1 ... N_RxAntDirSD;
TxAntDirDD(k): the k-th transmitter antenna directional pattern in a destination device, k=1 ... N_TxAntDirDD; and
RxAntDirDD(k): the k-th receiver antenna directional pattern in a destination device, k=1 ... N_RxAntDirDD.

An antenna directional pattern (ADP) may be any form that describes the spatial angular dependence of the strength of the EM waves transmitted or received from an antenna, e.g., a sector in a sector switching antenna or a beam pattern formed by an antenna array, etc.

Figure 4:
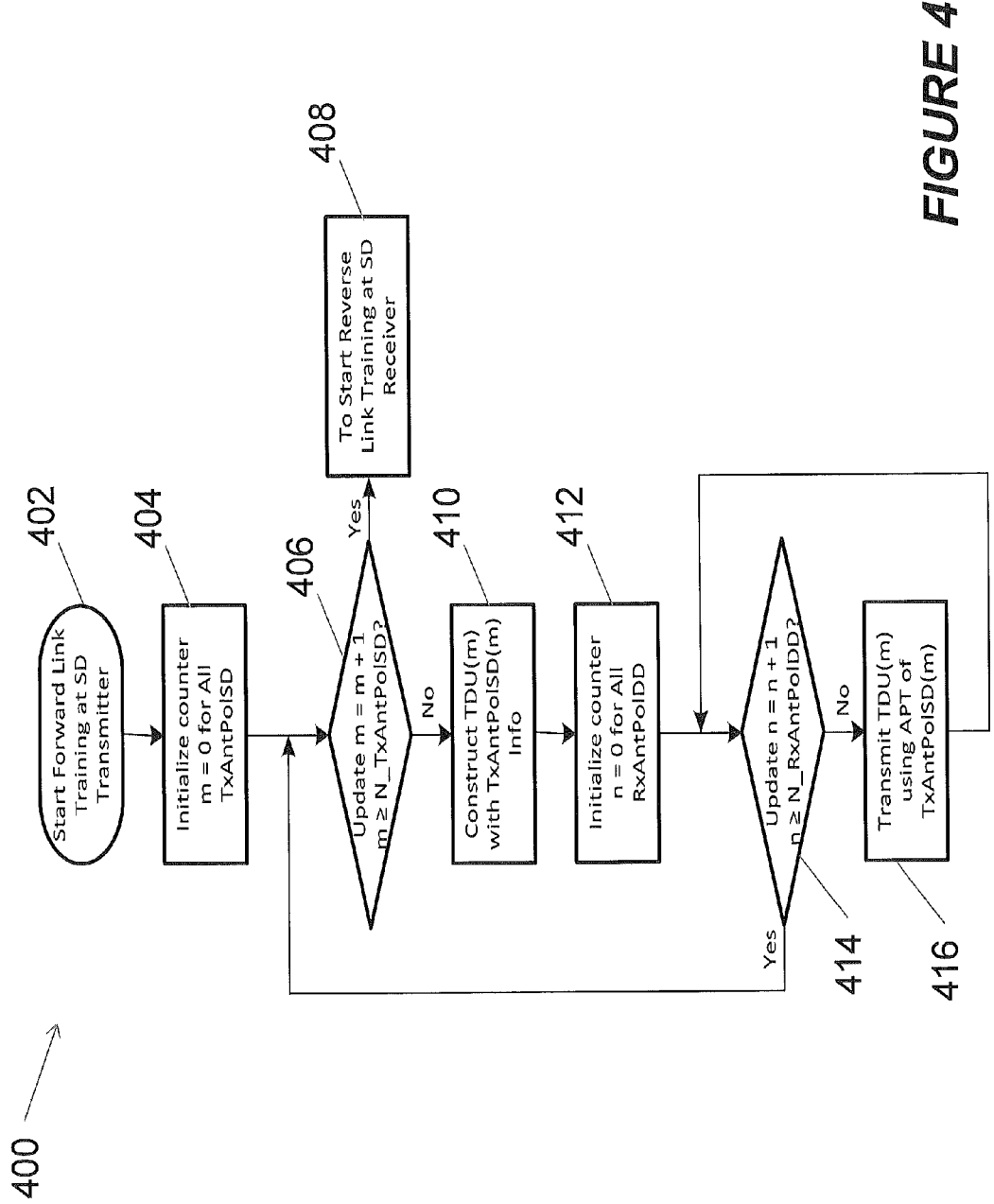
FIG. 4 illustrates a flow chart of an exemplary method for performing forward link polarization training at a source device (SD) in accordance with one or more embodiments.
Figure 5:
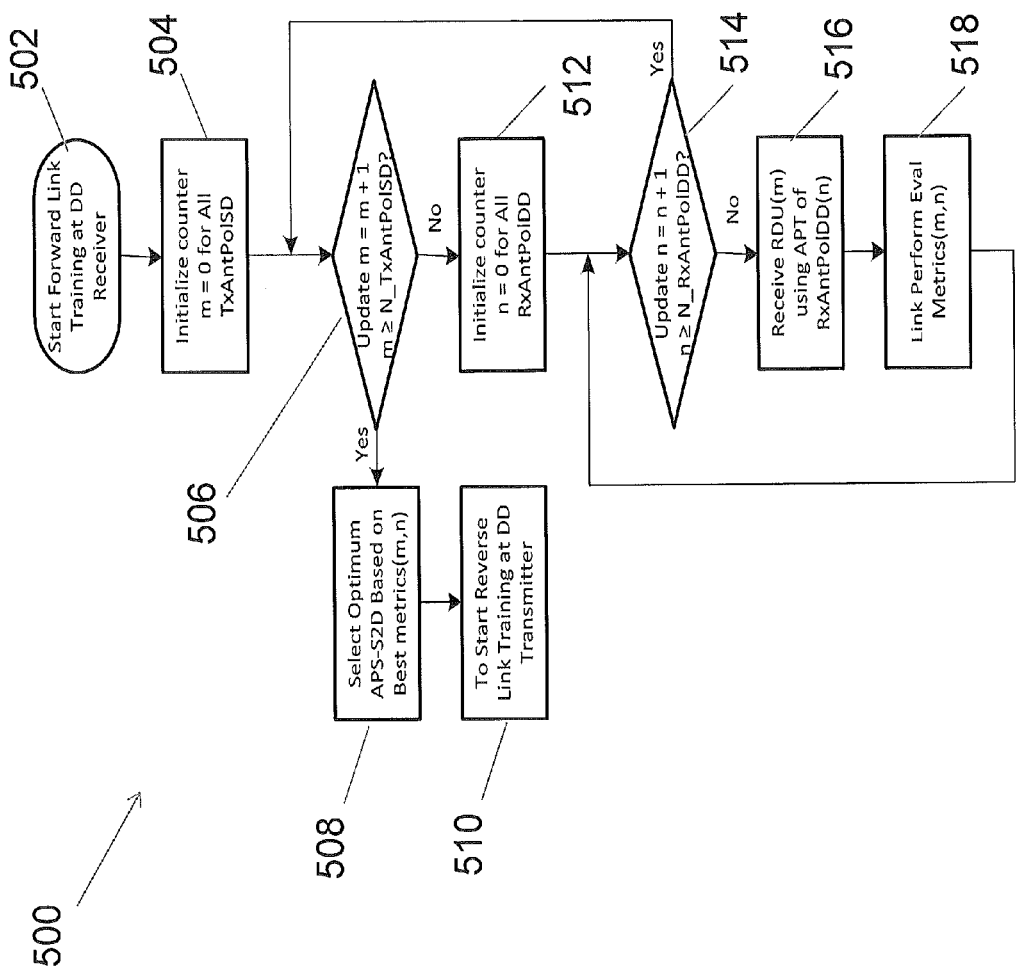
FIG. 5 illustrates a flow chart of an exemplary method for performing forward link polarization training at a destination device (DD) in accordance with one or more embodiments.
Figure 6:
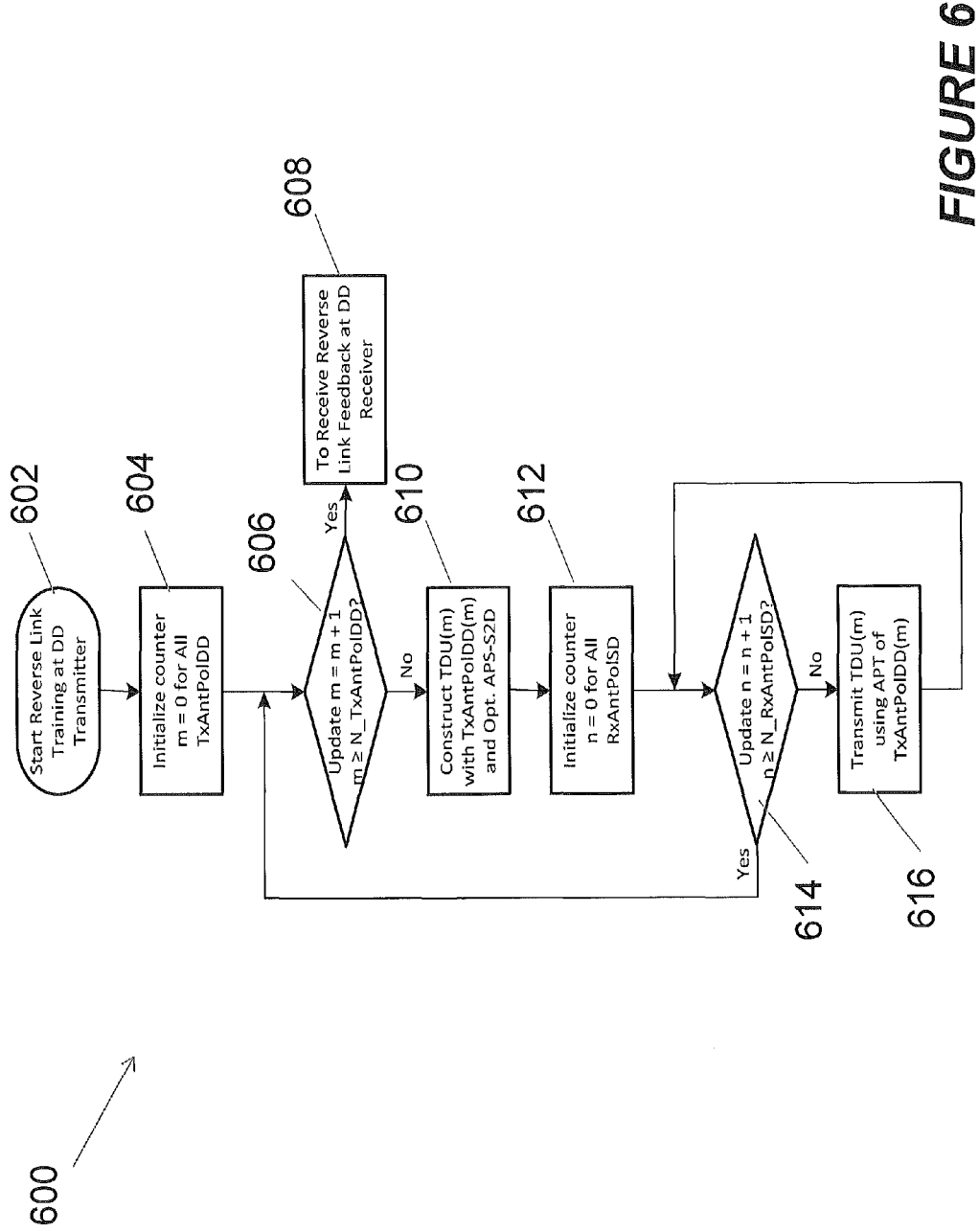
FIG. 6 illustrates a flow chart of an exemplary method for performing reverse link polarization training at a DD in accordance with one or more embodiments.
Figure 7:
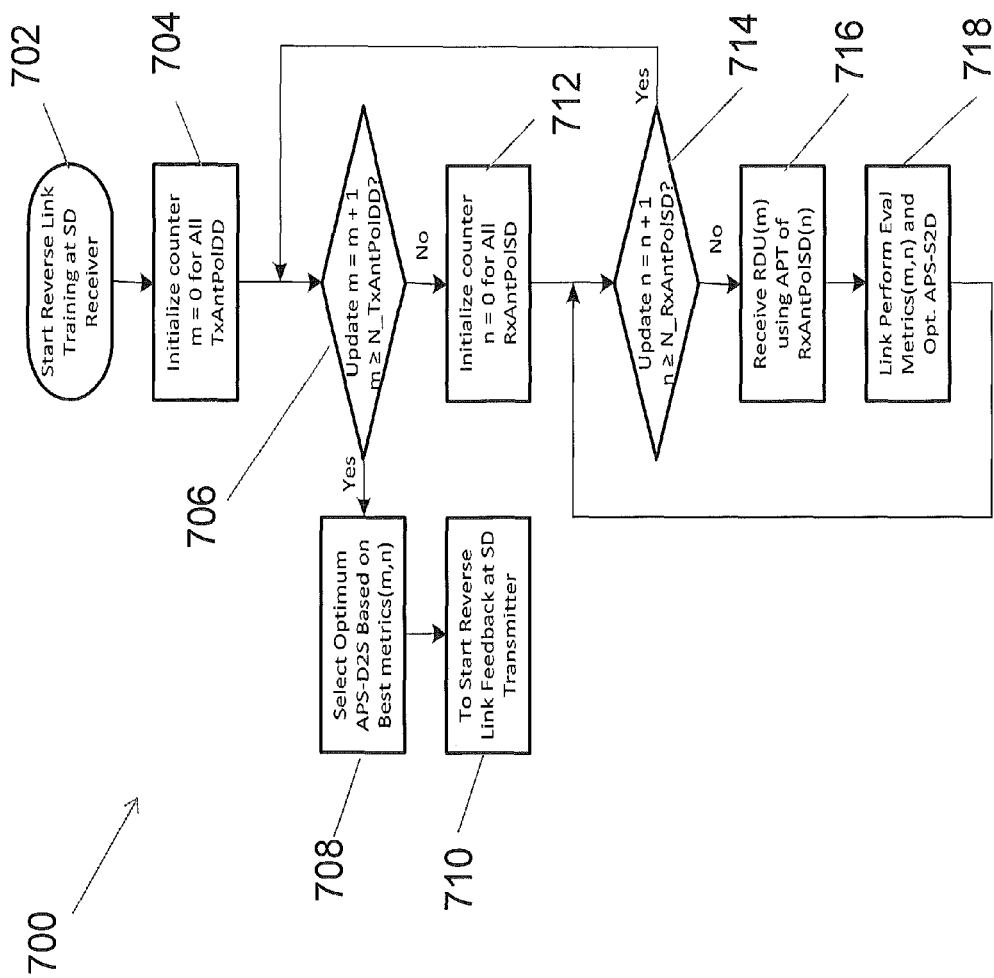
FIG. 7 illustrates a flow chart of an exemplary method for performing reverse link polarization training at a SD in accordance with one or more embodiments.
Figure 8:
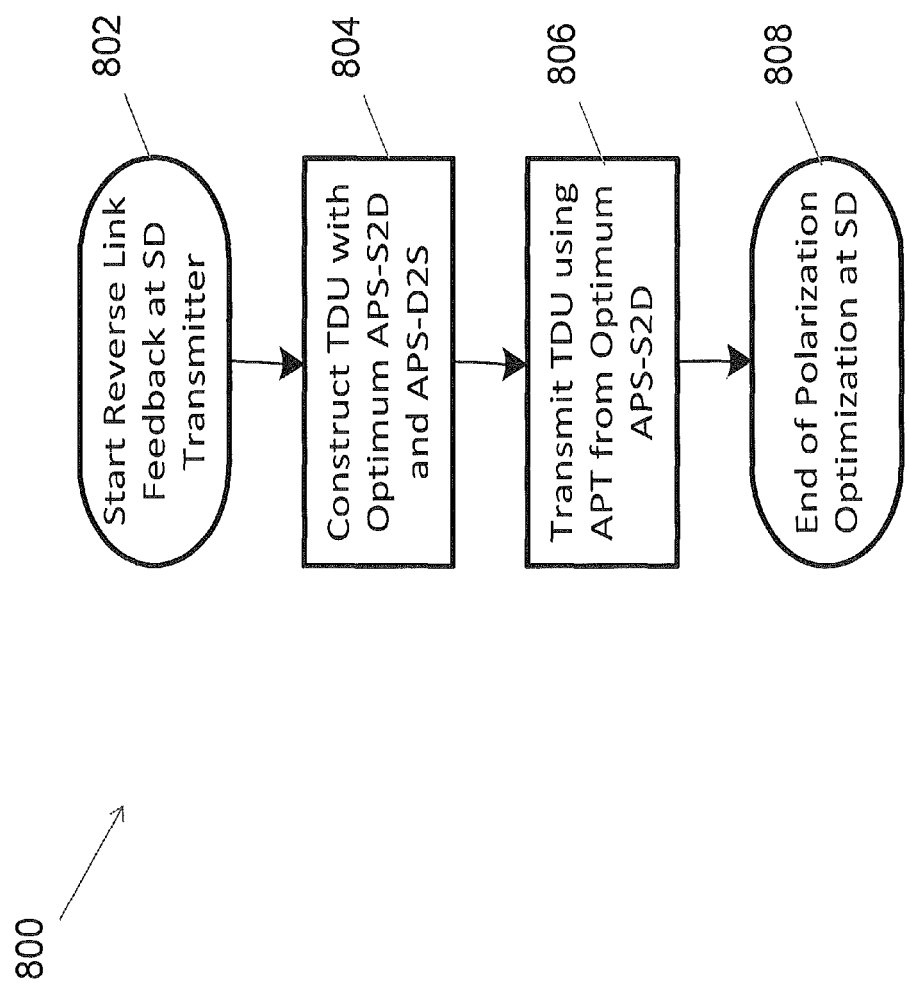
FIG. 8 illustrates a flow chart of an exemplary method for providing feedback from a SD to a DD regarding results from a reverse link polarization optimization in accordance with one or more embodiments.
Figure 9:
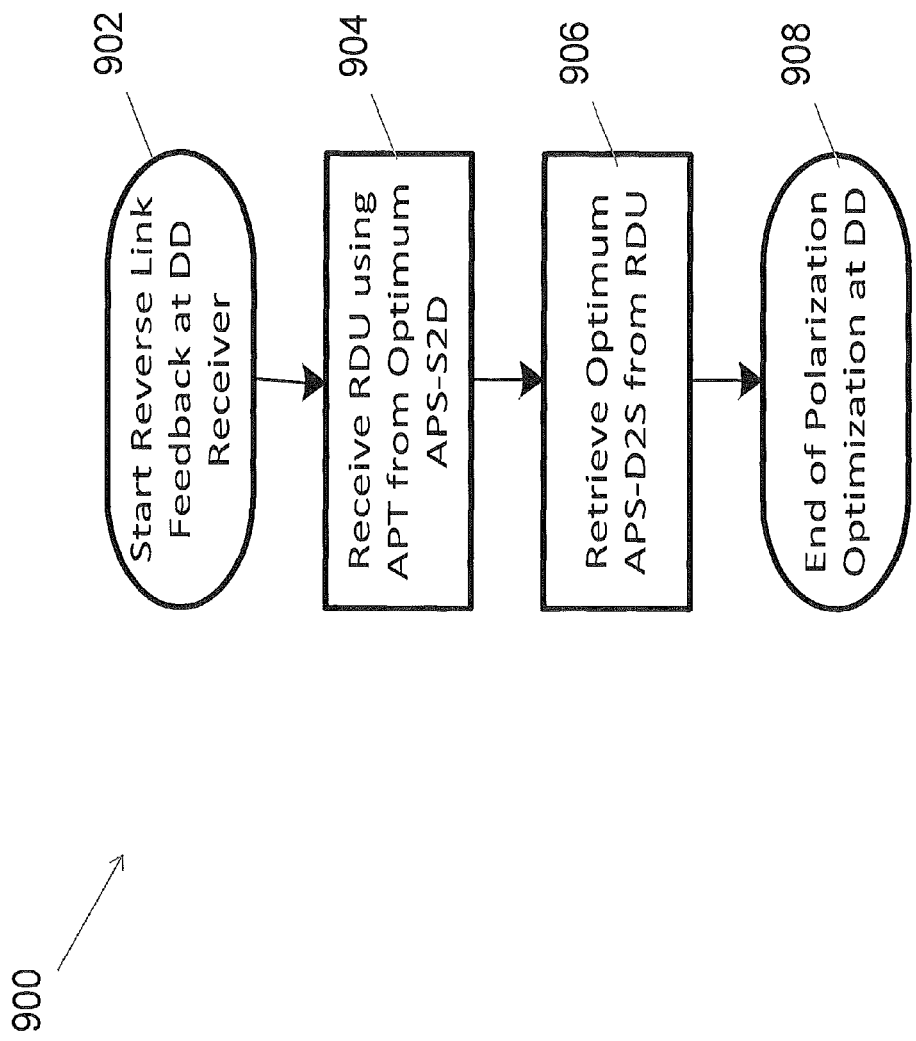
FIG. 9 illustrates a flow chart of an exemplary method for received feedback from a SD by a DD regarding results from a reverse link polarization optimization in accordance with one or more embodiments.

In some embodiments, the forward link (from source device (SD) to destination device (DD)) polarization training starts simultaneously at SD and DD as shown in FIG. 4 and FIG. 5, respectively. The forward link polarization training may be followed by the polarization training for the reverse link (from DD to SD) as shown in FIG. 6 and FIG. 7. A feedback of the polarization of the reverse link is shown in FIG. 8 and FIG. 9. Upon completion of the training process, both the SD and the DD may acquire the optimum APSs, APS-S2D and APS-D2S, for both the forward and reverse links. Other relevant information, such as the link performance metrics, may be transmitted in the reverse link training and the feedback process.

The approach to the polarization training may assume the knowledge of the N_RxAntPolDD in the SD and the N_RxAntPolSD in the DD. This assumption may be valid when both the SD and DD devices are in a post-networking stage where the devices have been associated and synchronized with a network managed by a network controller, e.g., an access point (AP) or a personal basic service set (PBSS) control point (PCP). The information can be exchanged between the SD and the DD via the network controller. In the case of a pre-networking stage where the information of the DD such as the N_RxAntPolDD, etc., may not be known by the SD, a specialized training process is described further below.

Turning now specifically to FIG. 4, a flow chart of a method 400 is shown. The method 400 may be used to perform forward link polarization training at a SD.

In block 402, the method 400 may start.

In block 404, a counter (m) may be initialized (e.g., m=0) for all TxAntPolSD.

In block 406, the counter (m) may be incremented (e.g., m=m+1). As part of block 406, a determination may be made whether the counter (m) is greater than or equal to N_TxAntPolSD. If so (e.g., the "Yes" path is taken out of block 406), flow may proceed to block 408 to start reverse link training at the SD receiver, where block 408 may correspond to block 702 described below. Otherwise (e.g., the "No" path is taken out of block 406), flow may proceed from block 406 to block 410.

In block 410, a TDU may be constructed with TxAntPolSD(m) included as information or data therein.

In block 412, a second counter (n) may be initialized (e.g., n=0) for all RxAntPolDD.

In block 414, the second counter (n) may be incremented (e.g., n=n+1). As part of block 414, a determination may be made whether the second counter (n) is greater than or equal to N_RxAntPolDD. If so (e.g., the "Yes" path is taken out of block 414), flow may proceed from block 414 to block 406. Otherwise (e.g., the "No" path is taken out of block 414), flow may proceed from block 414 to block 416.

In block 416, the TDU constructed in block 410 may be transmitted. Flow may proceed from block 416 to block 414.

Turning now specifically to FIG. 5, a flow chart of a method 500 is shown. The method 500 may be used to perform forward link polarization training at a DD.

In block 502, the method 500 may start.

In block 504, a counter (m) may be initialized (e.g., m=0) for all TxAntPolSD.

In block 506, the counter (m) may be incremented (e.g., m=m+1). As part of block 506, a determination may be made whether the counter (m) is greater than or equal to N_TxAntPolSD. If so (e.g., the "Yes" path is taken out of block 506), flow may proceed to block 508. Otherwise (e.g., the "No" path is taken out of block 506), flow may proceed from block 506 to block 512.

In block 508, the optimum APS for the forward link direction (APS-S2D) may be selected. The selection may be based on one or more metrics.

In block 510, reverse link training may be started at the DD transmitter. In some embodiments, block 510 may correspond to block 602 described below.

In block 512, a second counter (n) may be initialized (e.g., n=0) for all RxAntPolDD.

In block 514, the second counter (n) may be incremented (e.g., n=n+1). As part of block 514, a determination may be made whether the second counter (n) is greater than or equal to N_RxAntPolDD. If so (e.g., the "Yes" path is taken out of block 514), flow may proceed from block 514 to block 506. Otherwise (e.g., the "No" path is taken out of block 514), flow may proceed from block 514 to block 516.

In block 516, the DD may receive an RDU(m) using an APT of RxAntPolDD(n).

In block 518, a performance evaluation of the link may be performed. The performance evaluation may be based on the polarization type of the transmitter in the SD (which may be based on the counter m) and the polarization type of the receiver in the DD (which may be based on the second counter n). The performance evaluation may be stored for purposes of comparison and selection in block 508.

Turning now specifically to FIG. 6, a flow chart of a method 600 is shown. The method 600 may be used to perform reverse link polarization training at a DD.

In block 602, the method 600 may start.

In block 604, a counter (m) may be initialized (e.g., m=0) for all TxAntPolDD.

In block 606, the counter (m) may be incremented (e.g., m=m+1). As part of block 606, a determination may be made whether the counter (m) is greater than or equal to N_TxAntPolDD. If so (e.g., the "Yes" path is taken out of block 606), flow may proceed to block 608 to receive reverse link feedback at the DD receiver, where block 608 may correspond to block 902 described below. Otherwise (e.g., the "No" path is taken out of block 606), flow may proceed from block 606 to block 610.

In block 610, a TDU may be constructed based on the TxAntPolDD(m) and/or the optimum APS-S2D (e.g., block 508).

In block 612, a second counter (n) may be initialized (e.g., n=0) for all RxAntPolSD.

In block 614, the second counter (n) may be incremented (e.g., n=n+1). As part of block 614, a determination may be made whether the second counter (n) is greater than or equal to N_RxAntPolSD. If so (e.g., the "Yes" path is taken out of block 614), flow may proceed from block 614 to block 606. Otherwise (e.g., the "No" path is taken out of block 614), flow may proceed from block 614 to block 616.

In block 616, the TDU constructed in block 610 may be transmitted. Flow may proceed from block 616 to block 614.

Turning now specifically to FIG. 7, a flow chart of a method 700 is shown. The method 700 may be used to perform reverse link polarization training at a SD.

In block 702, the method 700 may start.

In block 704, a counter (m) may be initialized (e.g., m=0) for all TxAntPolDD.

In block 706, the counter (m) may be incremented (e.g., m=m+1). As part of block 706, a determination may be made whether the counter (m) is greater than or equal to N_TxAntPolDD. If so (e.g., the "Yes" path is taken out of block 706), flow may proceed to block 708. Otherwise (e.g., the "No" path is taken out of block 706), flow may proceed from block 706 to block 712.

In block 708, the optimum APS for the reverse link direction (APS-D2S) may be selected. The selection may be based on one or more metrics.

In block 710, reverse link feedback at the SD transmitter may be started. In some embodiments, block 710 may correspond to block 802 described below.

In block 712, a second counter (n) may be initialized (e.g., n=0) for all RxAntPolSD.

In block 714, the second counter (n) may be incremented (e.g., n=n+1). As part of block 714, a determination may be made whether the second counter (n) is greater than or equal to N_RxAntPolSD. If so (e.g., the "Yes" path is taken out of block 714), flow may proceed from block 714 to block 706. Otherwise (e.g., the "No" path is taken out of block 714), flow may proceed from block 714 to block 716.

In block 716, the SD may receive an RDU(m) using an APT of RxAntPolSD(n).

In block 718, a performance evaluation of the link may be performed. The performance evaluation may be based on the polarization type of the transmitter in the DD (which may be based on the counter m) and the polarization type of the receiver in the SD (which may be based on the second counter n). The performance evaluation may be stored for purposes of comparison and selection in block 708.

Turning now specifically to FIG. 8, a flow chart of a method 800 is shown. The method 800 may be used by a SD to provide feedback to a DD regarding results from a reverse link polarization optimization.

In block 802, the method 800 may start.

In block 804, a TDU may be constructed. The TDU of block 804 may include the optimum APS-S2D (block 508) and/or the optimum APS-D2S (block 708).

In block 806, the TDU constructed in block 804 may be transmitted from the SD to the DD. The transmission may occur using the APT obtained from the optimum APS-S2D.

In block 808, the method 800 may end.

Turning now specifically to FIG. 9, a flow chart of a method 900 is shown. The method 900 may be used by a DD to receive feedback from a SD regarding results from a reverse link polarization optimization.

In block 902, the method 900 may start.

In block 904, a RDU may be received. The RDU of block 904 may be received using the APT from the optimum APS-S2D (block 508).

In block 906, the optimum APS-D2S may be retrieved from the RDU of block 904.

In block 908, the method 900 may end.

When directional antennas are available, directional pattern training may be combined with polarization training. The techniques described above can be used for any of the combinations of the directional patterns. That is, the polarization training can be embedded as an inner loop of the directional pattern training procedure, an example of which is described below for the forward link direction in connection with FIGS. 10 and 11. One skilled in the art would appreciate that a similar example could be constructed for the reverse link direction. In some embodiments, the directional pattern training can be placed in an inner loop of the polarization training process. That is, the directional pattern training can be based on a particular APS set by a polarization training outer loop.

Figure 10:
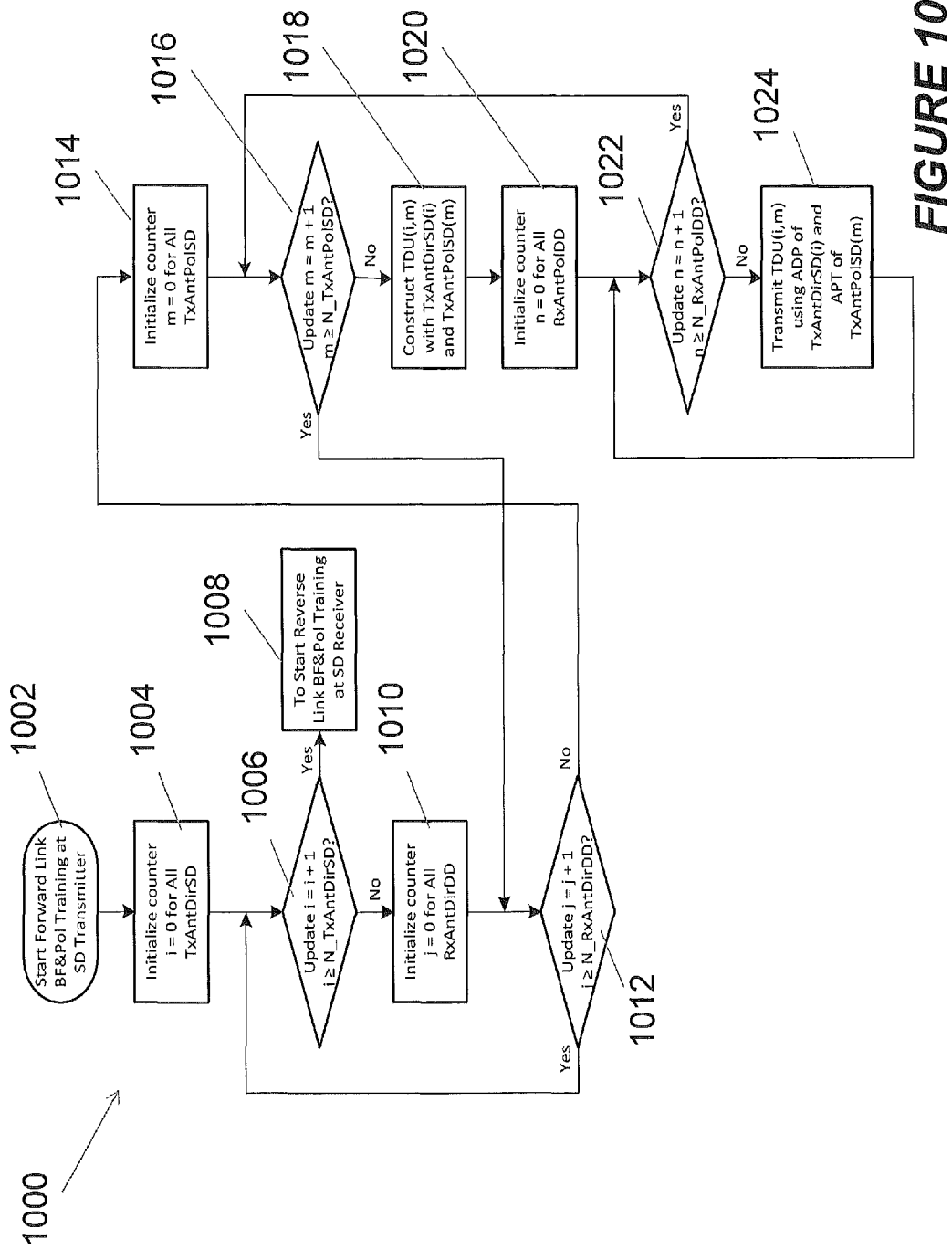
FIG. 10 illustrates a flow chart of an exemplary method for performing joint beam forming (BF) and polarization training for a forward link at a SD in accordance with one or more embodiments.

Turning now specifically to FIG. 10, a flow chart of a method 1000 is shown. The method 1000 may be used to perform joint beam forming (BF) and polarization training for a forward link at a SD.

In block 1002, the method 1000 may start.

In block 1004, a counter (i) may be initialized (e.g., i=0) for all TxAntDirSD.

In block 1006, the counter (i) may be incremented (e.g., i=i+1). As part of block 1006, a determination may be made whether the counter (i) is greater than or equal to N_TxAntDirSD. If so (e.g., the "Yes" path is taken out of block 1006), flow may proceed to block 1008 to start reverse link training at the SD receiver. Otherwise (e.g., the "No" path is taken out of block 1006), flow may proceed from block 1006 to block 1010.

In block 1010, a second counter (j) may be initialized (e.g., j=0) for all RxAntDirDD.

In block 1012, the second counter (j) may be incremented (e.g., j=j+1). As part of block 1012, a determination may be made whether the second counter (j) is greater than or equal to N_RxAntDirDD. If so (e.g., the "Yes" path is taken out of block 1012), flow may proceed from block 1012 to block 1006. Otherwise (e.g., the "No" path is taken out of block 1012), flow may proceed from block 1012 to block 1014.

In block 1014, a third counter (m) may be initialized (e.g., m=0) for all TxAntPolSD.

In block 1016, the third counter (m) may be incremented (e.g., m=m+1). As part of block 1016, a determination may be made whether the counter (m) is greater than or equal to N_TxAntPolSD. If so (e.g., the "Yes" path is taken out of block 1016), flow may proceed to block 1012. Otherwise (e.g., the "No" path is taken out of block 1016), flow may proceed from block 1016 to block 1018.

In block 1018, a TDU may be constructed based on the TxAntDirSD(i) and/or TxAntPolSD(m).

In block 1020, a fourth counter (n) may be initialized (e.g., n=0) for all RxAntPolDD.

In block 1022, the fourth counter (n) may be incremented (e.g., n=n+1). As part of block 1022, a determination may be made whether the fourth counter (n) is greater than or equal to N_RxAntPolDD. If so (e.g., the "Yes" path is taken out of block 1022), flow may proceed from block 1022 to block 1018. Otherwise (e.g., the "No" path is taken out of block 1022), flow may proceed from block 1022 to block 1024.

In block 1024, the TDU constructed in block 1018 may be transmitted using the ADP of TxAntDirSD(i) and the APT of TxAntPolSD(m). Flow may proceed from block 1024 to block 1022.

Figure 11:
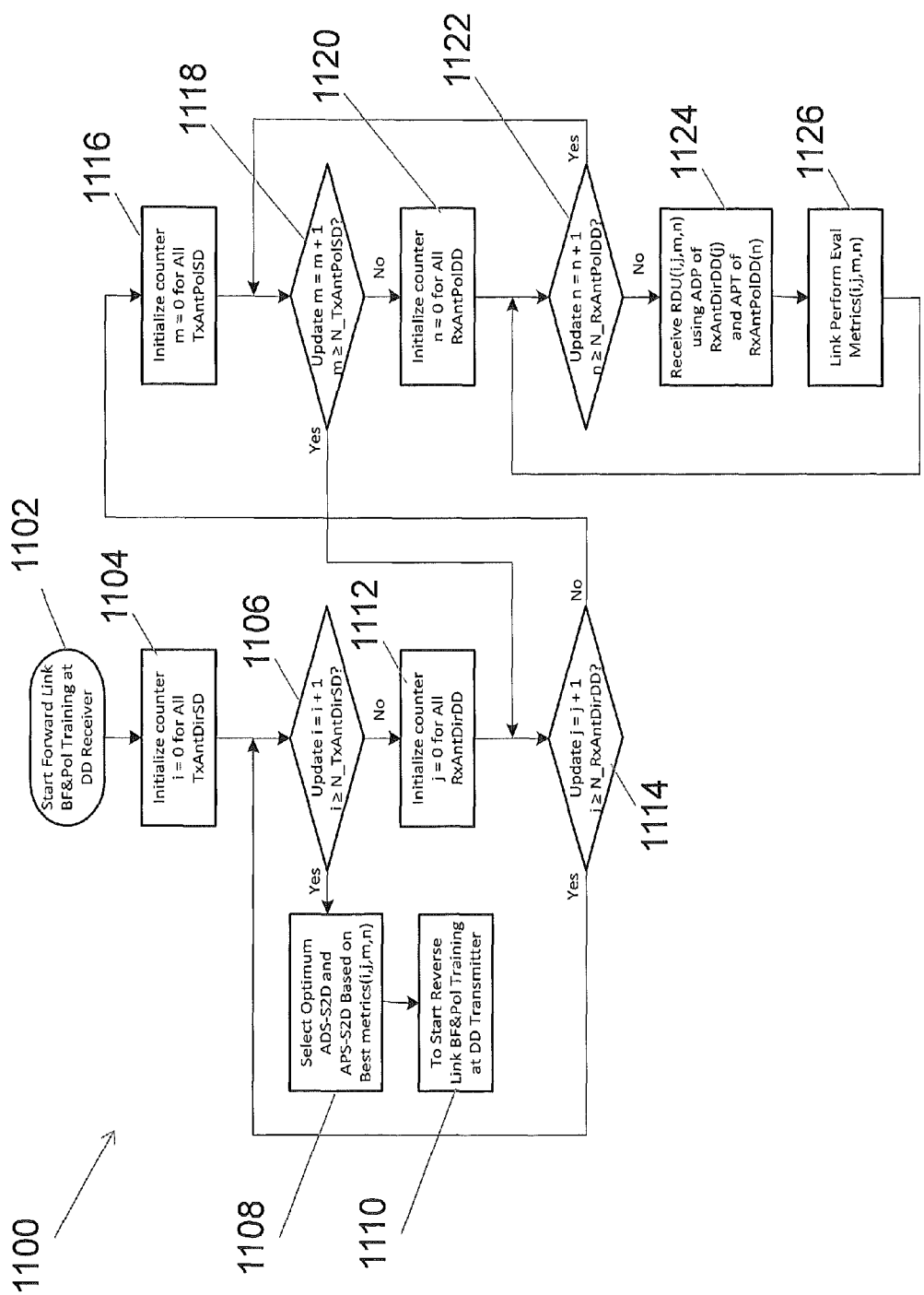
FIG. 11 illustrates a flow chart of an exemplary method for performing joint BF and polarization training for a forward link at a DD in accordance with one or more embodiments.

Turning now specifically to FIG. 11, a flow chart of a method 1100 is shown. The method 1100 may be used to perform joint beam forming (BF) and polarization training for a forward link at a DD.

In block 1102, the method 1100 may start.

In block 1104, a counter (i) may be initialized (e.g., i=0) for all TxAntDirSD.

In block 1106, the counter (i) may be incremented (e.g., i=i+1). As part of block 1106, a determination may be made whether the counter (i) is greater than or equal to N_TxAntDirSD. If so (e.g., the "Yes" path is taken out of block 1106), flow may proceed to block 1108. Otherwise (e.g., the "No" path is taken out of block 1106), flow may proceed from block 1106 to block 1112.

In block 1108, the optimum antenna directional scheme (ADS) for the forward link direction (ADS-S2D) and/or the optimum APS for the forward link direction (APS-S2D) may be selected. The selection(s) may be based on one or more metrics.

In block 1110, reverse link joint BF and polarization training may be started at the DD transmitter.

In block 1112, a second counter (j) may be initialized (e.g., j=0) for all RxAntDirDD.

In block 1114, the second counter (j) may be incremented (e.g., j=j+1). As part of block 1114, a determination may be made whether the second counter (j) is greater than or equal to N_RxAntDirDD. If so (e.g., the "Yes" path is taken out of block 1114), flow may proceed to block 1106. Otherwise (e.g., the "No" path is taken out of block 1114), flow may proceed from block 1114 to block 1116.

In block 1116, a third counter (m) may be initialized (e.g., m=0) for all TxAntPolSD.

In block 1118, the third counter (m) may be incremented (e.g., m=m+1). As part of block 1118, a determination may be made whether the third counter (m) is greater than or equal to N_TxAntPolSD. If so (e.g., the "Yes" path is taken out of block 1118), flow may proceed to block 1114. Otherwise (e.g., the "No" path is taken out of block 1118), flow may proceed from block 1118 to block 1120.

In block 1120, a fourth counter (n) may be initialized (e.g., n=0) for all RxAntPolDD.

In block 1122, the fourth counter (n) may be incremented (e.g., n=n+1). As part of block 514, a determination may be made whether the fourth counter (n) is greater than or equal to N_RxAntPolDD. If so (e.g., the "Yes" path is taken out of block 1122), flow may proceed from block 1122 to block 1118. Otherwise (e.g., the "No" path is taken out of block 1122), flow may proceed from block 1122 to block 1124.

In block 1124, the DD may receive an RDU(i,j,m,n) using an ADP of RxAntDirDD(j) and an APT of RxAntPolDD(n).

In block 1126, a performance evaluation of the link may be performed. The performance evaluation may be based on the polarization type and antenna direction of the transmitter in the SD (which may be based on the counter m and the counter i, respectively) and the polarization type and antenna direction of the receiver in the DD (which may be based on the counter n and the counter j, respectively). The performance evaluation may be stored for purposes of comparison and selection in block 1108.

In some embodiments, the directional pattern training may be performed separately from the polarization training. An example is described further below.

In some instances, the forward link and the reverse link are reciprocal. For example, both the transmitter and receiver in the SD and DD may share the same antenna sectors or antenna arrays. The optimum APS-D2S might be equivalent to the optimum APS-S2D, and the reverse link training can be simplified in this case by using a single APT from the optimum APS-S2D in the transmitter of the DD. The SD may still need to go through all or part of the APTs with the SD receiver to find out the best APT associated with the APS-S2D for the reverse link. The training process can be terminated once a RDU can be successfully decoded and the best APT can be retrieved from the RDU.

It can be generalized that both sector sweep and beam refinement/tracking in the beam forming (BF) training of IEEE 802.11 ad are conducted by changing the antenna directional patterns (ADPs). The numbers of TX and RX antenna directional patterns may be defined by the notations above. A pair of such TX and RX ADPs, called antenna directivity scheme (ADS), uniquely determines the radio transmission paths (i.e., indirect paths and/or the direct path) when the transmitter and the receiver placements are fixed.

An approach to polarization optimization may be a joint optimization process with the directional patterns training. Specifically, given a pair of antenna directional patterns, e.g., TxAntDirSD(i) and RxAntDirDD(j) for the forward link, the radio link performance may be evaluated over all combinations of transmit and receive antenna polarization types (APTs) {TxAntPolSD(m), RxAntPolDD(n)} where the APTs may be defined by the notations above. It may be assumed that the total numbers of TX and RX antenna polarization types are N_TxAntPolSD and N_RxAntPolDD, as defined respectively by the notations above (e.g., N_TxAntPolSD=N_RxAntPolDD=4 for TX/RX polarization types being HLP, VLP, LHCP, and RHCP). The "best" transmit and receive antenna polarization types are determined by conducting link performance measurement with some pre-defined algorithms, e.g., by evaluating the SNRs, the uncoded BERs, etc. The total number of transmitted data units (TDUs) that may be required for both the polarization optimization and the beamforming training for the example of forward link is: N_TxAntDirSD×N_RxAntDirDD×N_TxAntPolSD×N_RxAntPolDD, where 'x' signifies multiplication.

The block diagrams described above show the details of the training process when combining beam forming training with the polarization training for the example of forward link. The training processes may start simultaneously on both SD and the DD, as shown in FIG. 10 and FIG. 11, respectively. The outcome may be a joint optimization of the antenna directivity scheme, ADS-S2D, and the antenna polarization scheme, APS-S2D.

Similar processes with additional feedback information of both the optimum ADS-S2D and the optimum APS-S2D can be applied to the reverse link. The final reverse link feedback process may include both the optimum ADS-D2S and the optimum APS-D2S sent from the SD to the DD. Diagrams/figures for the reverse link training and the reverse link feedback processes are omitted, as it is straightforward to one of skill in the art to derive them from FIGS. 4-11.

Pre-networking is a process that may occur before a device establishes an association with a serving network maintained by a network controller. The controller might not have the information of the device beforehand. The controller may transmit one or more broadcast signals (BSs) periodically in order to have devices acquire information (e.g., synchronization information) and to be associated with the network. In IEEE 802.11ad, for example, the controller can be an Access Point (AP) or a personal basic service set (PBSS) control point (PCP). Beacon frames may be transmitted by the AP or PCP in beacon intervals.

The forward link (from a network controller, which is served as an SD, to any DD) polarization training may be devised by including the controller's APT information in the broadcast signal (BS), which is a form of the TDU described above. A set of N_TxAntPolSD BSs may be transmitted using APTs corresponding to the APT information in each of the signals. The whole set of BSs can be located within a broadcast signal repetition interval (BSRI) or extended to multiple BSRIs. To facilitate the polarization training in an SD, the same set of the BSs may be transmitted periodically across one BSRI or multiple BSRIs. The schedule information for BSs and BSRIs may be included in each of the BSs. The DD may start in a scanning mode with one of the APTs available to it until it successfully receives a BS with an APT. The DD may then learn the APTs information of the SD (controller), the schedule of the BS for the network, the synchronization information, etc. The DD can select the optimum APS-S2D based on the best metrics of all the received BSs with all the APSs between the SD and itself.

The reverse link polarization training and the feedback process can be scheduled in specific time slots by the controller and can be done in slots in a manner similar to that described above. The reverse link training might only be scheduled and started after successful forward link training.

Figure 12:
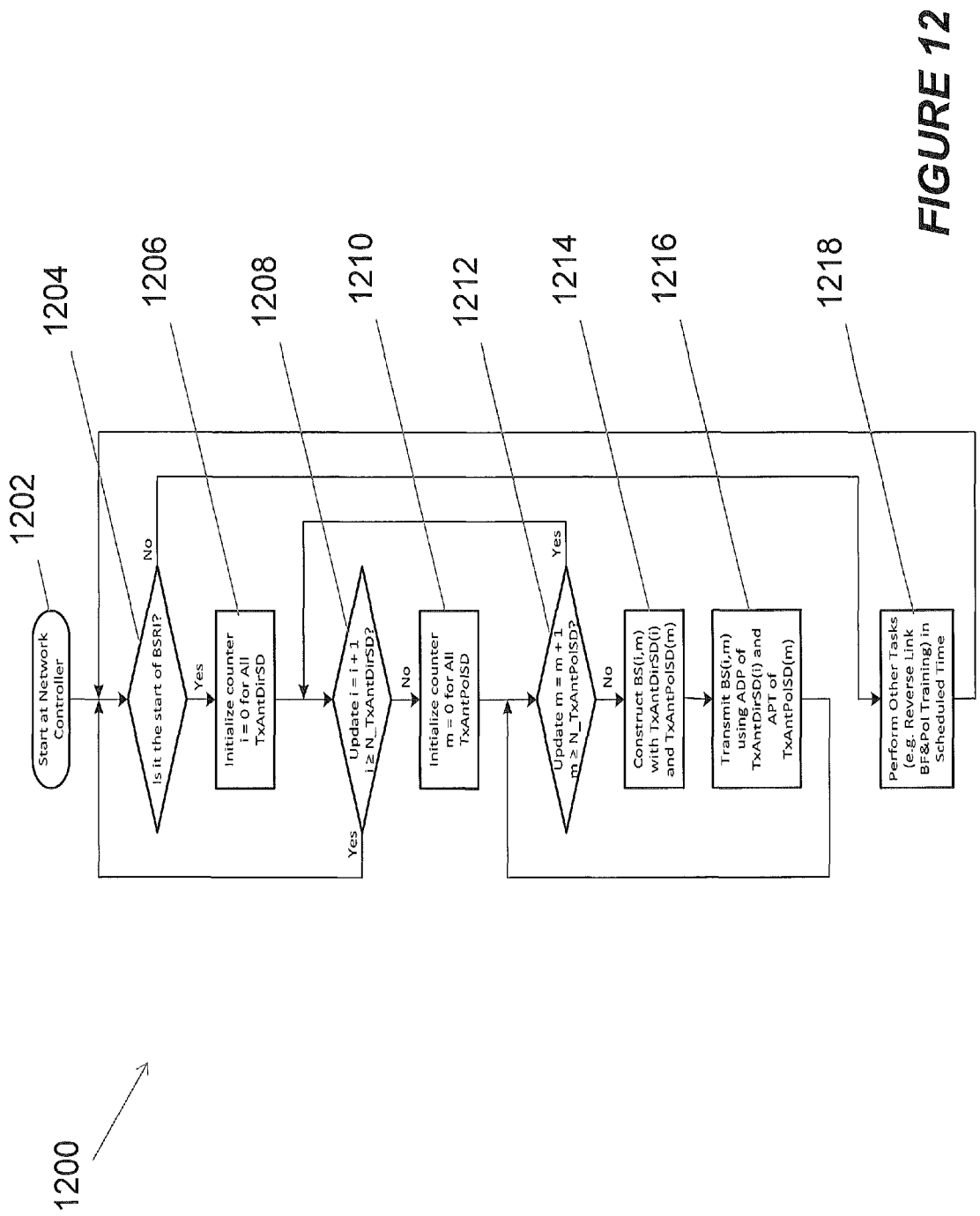
FIG. 12 illustrates a flow chart of an exemplary method for performing joint BF and polarization optimization for a forward link during a pre-networking at a network controller (or SD) in accordance with one or more embodiments.
Figure 13:
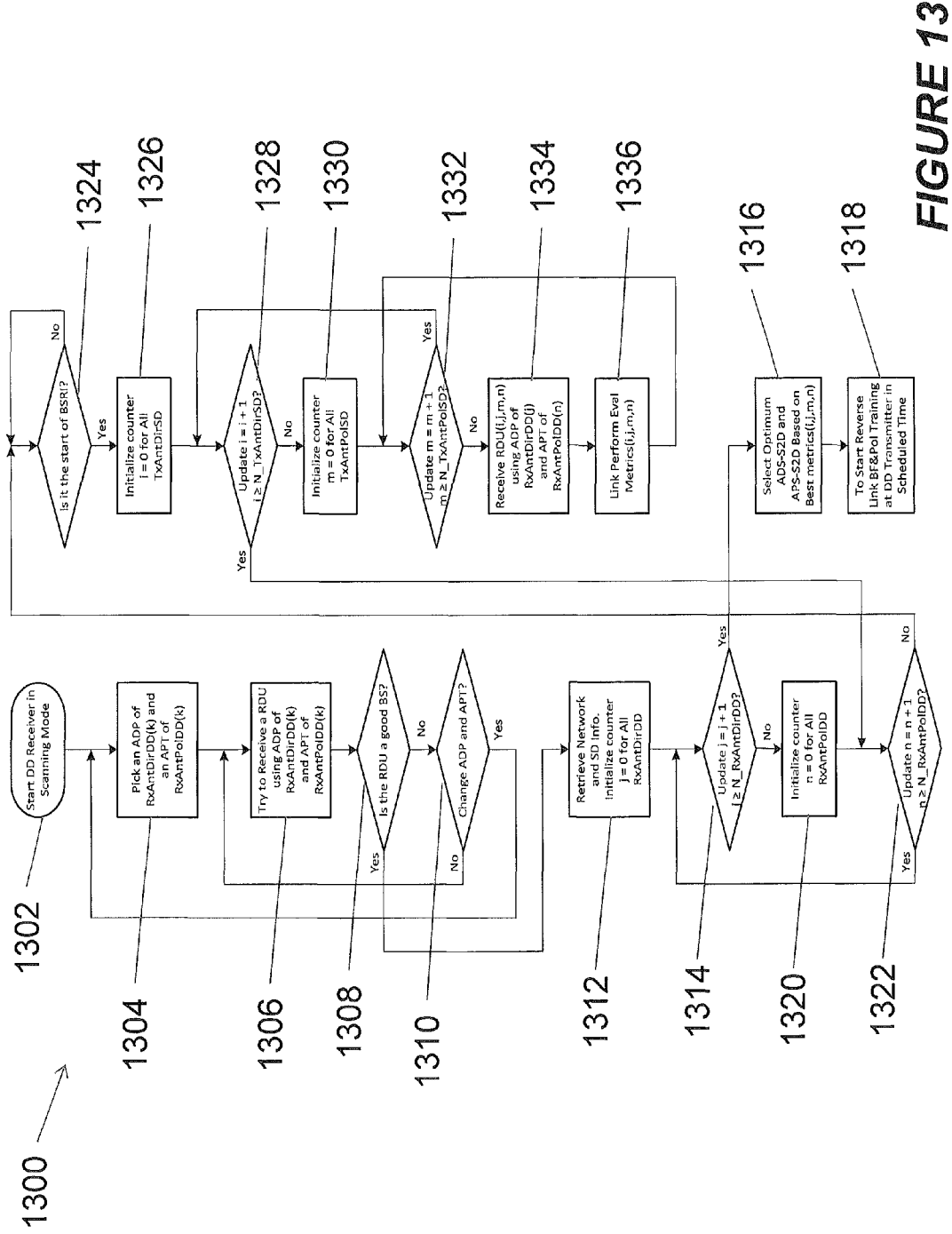
FIG. 13 illustrates a flow chart of an exemplary method for performing joint BF and polarization optimization for a forward link during a pre-networking at a DD in accordance with one or more embodiments.

In some embodiments, when directional antennas are used by the controller and the DD, the best approach may be to combine the beam forming (BF) training with the polarization training. Polarization training at the pre-networking stage can be applied to any pair of antenna directional patterns of the TX and RX in the controller and a DD. That is, the polarization training can be placed in the most inner loop of the BF training. FIGS. 12 and 13 illustrate the combined training in this optimization approach. Alternatively, the BF training can be placed in the most inner loop of the polarization training. That is, the BF process can be applied to any pair of antenna polarization types.

Turning now specifically to FIG. 12, a flow chart of a method 1200 is shown. The method 1200 may be used to perform joint beam forming (BF) and polarization optimization for a forward link during pre-networking at a network controller (or SD).

In block 1202, the method 1200 may start.

In block 1204, a determination may be made whether it is the start of a BSRI. If so (e.g., the "Yes" path is taken out of block 1204), flow may proceed to block 1206. Otherwise, (e.g., the "No" path is taken out of block 1204), flow may proceed from block 1204 to block 1218.

In block 1206, a counter (i) may be initialized (e.g., i=0) for all TxAntDirSD.

In block 1208, the counter (i) may be incremented (e.g., i=i+1). As part of block 1208, a determination may be made whether the counter (i) is greater than or equal to N_TxAntDirSD. If so (e.g., the "Yes" path is taken out of block 1208), flow may proceed to block 1204. Otherwise (e.g., the "No" path is taken out of block 1208), flow may proceed from block 1208 to block 1210.

In block 1210, a second counter (m) may be initialized (e.g., m=0) for all TxAntPolSD.

In block 1212, the second counter (m) may be incremented (e.g., m=m+1). As part of block 1212, a determination may be made whether the second counter (m) is greater than or equal to N_TxAntPolSD. If so (e.g., the "Yes" path is taken out of block 1212), flow may proceed from block 1212 to block 1208. Otherwise (e.g., the "No" path is taken out of block 1212), flow may proceed from block 1212 to block 1214.

In block 1214, a BS may be constructed based on the TxAntDirSD(i) and/or TxAntPolSD(m).

In block 1216, the BS constructed in block 1214 may be transmitted using the ADP of TxAntDirSD(i) and the APT of TxAntPolSD(m). Flow may proceed from block 1216 to block 1212.

In block 1218, other tasks, such as reverse link BF and polarization training, may be performed in scheduled time slots.

Turning now specifically to FIG. 13, a flow chart of a method 1300 is shown. The method 1300 may be used to perform joint beam forming (BF) and polarization optimization for a forward link during pre-networking at a DD.

In block 1302, the method 300 may start.

In block 1304, an ADP of RxAntDirDD(k) and an APT of RxAntPolDD(k) may be selected.

In block 1306, an attempt may be made to receive a RDU using the selected ADP and APT of block 1304.

In block 1308, a determination may be made whether the RDU of block 1306 is a "good" BS. A good BS may be one that satisfies one or more signal quality related parameters, such as having one or more of a specified RSSI, SNR, BER, etc. and successfully passes the decoding and the CRC, if any.

If, in block 1308, it is determined that the RDU is a good BS (e.g., the "Yes" path is taken out of block 1308), flow may proceed to block 1312. Otherwise (e.g., the "No" path is taken out of block 1308), flow may proceed from block 1308 to block 1310.

In block 1310, a determination may be made whether one or both of the ADP and APT selected in block 1304 should be changed. For example, if additional ADPs or APTs are available for use and if no RDUs of a good BS have been received with the current ADP/APT for an extended time period (predetermined), then a determination may be made to change the ADP and/or APT. Otherwise, the ADP and APT may be maintained.

If, in block 1310, it is determine that the ADP and/or APT should be changed (e.g., the "Yes" path is taken out of block 1310), flow may proceed to block 1304. Otherwise (e.g., the "No" path is taken out of block 1310), flow may proceed from block 1310 to block 1306.

In block 1312, network and SD information may be retrieved. As part of block 1312, a counter (j) may be initialized (e.g., j=0) for all RxAntDirDD.

In block 1314, the counter (j) may be incremented (e.g., j=j+1). As part of block 1314, a determination may be made whether the counter (j) is greater than or equal to N_RxAntDirDD. If so (e.g., the "Yes" path is taken out of block 1314), flow may proceed from block 1314 to block 1316. Otherwise (e.g., the "No" path is taken out of block 1314), flow may proceed from block 1314 to block 1320.

In block 1316, the optimum ADS-S2D and/or the optimum APS-S2D may be selected. The selection(s) may be based on one or more metrics.

In block 1318, reverse link BF and polarization training at the DD transmitter may be started. The reverse link training may occur in accordance with a schedule.

In block 1320, a second counter (n) may be initialized (e.g., n=0) for all RxAntPolDD.

In block 1322, the second counter (n) may be incremented (e.g., n=n+1). As part of block 1322, a determination may be made whether the second counter (n) is greater than or equal to N_RxAntPolDD. If so (e.g., the "Yes" path is taken out of block 1322), flow may proceed from block 1322 to block 1314. Otherwise (e.g., the "No" path is taken out of block 1322), flow may proceed from block 1322 to block 1324.

In block 1324, a determination may be made whether it is the start of a BSRI. If so (e.g., the "Yes" path is taken out of block 1324), flow may proceed to block 1326. Otherwise, (e.g., the "No" path is taken out of block 1324), flow may remain at block 1324.

In block 1326, a third counter (i) may be initialized (e.g., i=0) for all TxAntDirSD.

In block 1328, the third counter (i) may be incremented (e.g., i=i+1). As part of block 1328, a determination may be made whether the third counter (i) is greater than or equal to N_TxAntDirSD. If so (e.g., the "Yes" path is taken out of block 1328), flow may proceed from block 1328 to block 1322. Otherwise (e.g., the "No" path is taken out of block 1328), flow may proceed from block 1328 to block 1330.

In block 1330, a fourth counter (m) may be initialized (e.g., m=0) for all TxAntPolSD.

In block 1332, the fourth counter (m) may be incremented (e.g., m=m+1). As part of block 1332, a determination may be made whether the fourth counter (m) is greater than or equal to N_TxAntPolSD. If so (e.g., the "Yes" path is taken out of block 1332), flow may proceed from block 1332 to block 1328. Otherwise (e.g., the "No" path is taken out of block 1332), flow may proceed from block 1332 to block 1334.

In block 1334, an RDU may be used using an ADP of RxAntDirDD(j) and an APT of RxAntPolDD(n).

In block 1336, a performance evaluation of the link may be performed. The performance evaluation may be based on the polarization type (which may be based on the counter m) and antenna direction (which may be based on the counter i) of the transmitter in the SD and the polarization type (which may be based on the counter n) and antenna direction (which may be based on the counter j) of the receiver in the DD. The performance evaluation may be stored for purposes of comparison and selection in block 1336.

It may be assumed in connection with FIG. 12 and/or FIG. 13 that a set of N_TxAntDirSD and N_TxAntPolSD BSs are transmitted in one BSRI and the whole set is repeated every BSRI. One skilled in the art would appreciate that the set could be partially transmitted in one BSRI and extended across multiple BSRIs as described above.

In some embodiments, a refinement may be made to a selected APS. For example, the optimum APS may be adjusted with a fine tuning of the ADP, e.g., at the beam refinement and tracking stages specified in IEEE 802.11 ad because a slight change in an antenna's steering angles may cause part or all of the reflections below or above the threshold of Brewster angle. In a LOS environment, it might not be necessary to perform polarization optimization refinement. However, in a NLOS environment, even a fine adjustment on the transmit antenna beam may result in a change in angles of reflections such that the polarization characteristics in a radio link may also change.

Polarization optimization refinement and tracking may be conducted along with beam forming refinement/tracking. The procedure may be the same as a general process for any given ADS.

As described above, the TX and RX antenna directions may yield a significant impact on the link polarization characteristics. Also, as described above, polarization training may be integrated with beam forming training. However, when the number of ADPs to be trained and the number of APTs to be optimized is relatively large (e.g., greater than a threshold), the complexity of the training procedure is high.

One approach to reduce the complexity of the training is to decouple the beam forming and the polarization optimization. The decoupling may be possible when both the TX and the RX antennas can be set to a quasi-omni pattern. Although the antenna gain with a quasi-omni pattern may be reduced, this special antenna directional scheme makes it possible to perform the polarization training independent of the beam forming training. Specifically, the polarization optimization can be done separately before the beam forming training. Because the number of ADPs may be reduced to one for both TX and RX, the total number of iterations for the polarization optimization may be reduced to the number of combinations of APS (e.g., N_TxAntPolSD×N_RxAntPolDD for a forward link). It can be verified that for the LOS environment, the best pair of TX and RX antenna polarizations with TX/RX beam forming is the same as TX/RX antenna polarizations optimized with quasi-omni TX/RX antennas. For the NLOS environment, this approach is suboptimal. One possible remedy is to perform a refinement for the polarization optimization as described above.

To simplify the polarization optimization process, either the TX or the RX antenna polarization type can be fixed through polarization optimization to further reduce the number of combinations of the APSs. In this case, either the N_TxAntPolSD or the N_RxAntPolDD for the forward link and/or either the N_TxAntPolDD or the N_RxAntPolSD for the reverse link can be reduced to one.

In some instances, a receiver may be able to conclude before the end of a full optimization process that the optimum link has been reached by some a priori knowledge of the performance metrics. The receiver may choose to early terminate the optimization process by signaling the transmitter if a feedback channel is available, or may simply stop the receiving process regardless of whether a feedback channel is available. The early termination may reduce the time and/or the energy consumed as a result of the optimization process.

Embodiments of the disclosure may be tied to one or more particular machines. For example, one or more transmitters or receivers may be used to train an antenna with respect to one or more polarization types or antenna direction. The training may be conducted to minimize the impact resulting from losses, such as polarization mismatch loss (PML), receiver processing loss (RPL), etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments of the disclosure may be implemented using one or more technologies. In some embodiments, an apparatus or system may include one or more processors, and memory storing instructions that, when executed by the one or more processors, cause the apparatus or system to perform one or more methodological acts, such as those described herein. Various mechanical components known to those of skill in the art may be used in some embodiments.

Embodiments of the disclosure may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts, such as those described herein. In some embodiments, the functionality described herein may be implemented in hardware, software, firmware, or any combination thereof.

The particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A method for providing communication between a first device and a second device, the method being performed during a pre-networking stage before the second device establishes an association with the first device, the method comprising:
   iterating, by the first device, over a first number of transmitter antenna polarization types in the first device;
   iterating, by the first device, for a given transmitter antenna polarization type, over a second number of transmitter antenna directional patterns in the first device among a plurality of different transmitter antenna directional patterns;
   periodically broadcasting the transmitter antenna polarization types in the first device;
   constructing, by the first device, a number of data units based on each of the transmitter antenna polarization types in the first device;
   transmitting, by the first device, each of the data units for each of a number of receiver antenna polarization types in the second device;
   receiving, by the first device, an indication of a transmitter antenna polarization type in the first device included in the number of transmitter antenna polarization types in the first device;
   receiving, by the first device, along with the indication of a transmitter antenna polarization type in the first device, an indication of a transmitter antenna directional pattern in the first device included in the number of transmitter antenna directional patterns in the first device; and
   transmitting, by the first device, data using the indicated transmitter antenna polarization,
   wherein the constructed number of data units is based upon a multiplication of the first number and the second number.

2. The method of claim 1, further comprising:
   iterating, by the first device, over a number of transmitter antenna polarization types in the second device;

iterating, by the first device, over a number of receiver antenna polarization types in the first device;

receiving, by the first device, a number of data units based on each of the transmitter antenna polarization types in the second device using each of the receiver antenna polarization types in the first device; and selecting, by the first device, a transmitter antenna polarization type for the second device included in the transmitter antenna polarization types in the second device and a receiver antenna polarization type for the first device included in the receiver antenna polarization types in the first device.

3. The method of claim 2, wherein the transmitted data comprises an indication of the selected transmitter antenna polarization type for the second device.

4. The method of claim 2, further comprising receiving, by the first device, second data using the selected receiver antenna polarization type for the first device.

5. The method of claim 1, wherein the number of receiver antenna polarization types in the second device is determined based on information obtained following the broadcasting.

6. The method of claim 1, further comprising:
receiving, by the first device, a second indication of a second transmitter antenna polarization type in the first device included in the number of transmitter antenna polarization types in the first device; and transmitting, by the first device, second data using the indicated second transmitter antenna polarization type.

7. The method of claim 1, wherein the communication between the first device and the second device is based on millimeter electromagnetic (EM) waves and a carrier frequency associated with the millimeter waveband.

8. A device comprising:
at least one processor; and
a memory having instructions stored thereon that, when executed by the at least one processor, cause the device, during a pre-networking stage, to:
iterate over a first number of transmitter antenna polarization types in the device;
iterate, for a given transmitter antenna polarization type, over a second number of transmitter antenna directional patterns in the device among a plurality of different transmitter antenna directional patterns;
periodically broadcast the transmitter antenna polarization types in the device in intervals during a stage before the first device establishes a connection with a serving communication network;
construct a number of data units based on each of the transmitter antenna polarization types;
transmit each of the data units for each of a number of receiver antenna polarization types in a second device, wherein the pre-networking stage is before the second device establishes an association with the device;
receive, from the second device, an indication of a transmitter antenna polarization type in the device included in the number of transmitter antenna polarization types in the device;
receive, from the second device, along with the indication of a transmitter antenna polarization type in the device, an indication of a transmitter antenna directional pattern in the device included in the number of transmitter antenna directional patterns in the device; and
transmit data using the indicated transmitter antenna polarization type, wherein the constructed number of data units is based upon a multiplication of the first number and the second number.

9. The device of claim 8, wherein the instructions, when executed by the at least one processor, cause the device to:
iterate over a number of transmitter antenna polarization types in the second device;
iterate over a number of receiver antenna polarization types in the device;
receive a number of data units based on each of the transmitter antenna polarization types in the second device using each of the receiver antenna polarization types in the device; and
select a transmitter antenna polarization type for the second device included in the transmitter antenna polarization types in the second device and a receiver antenna polarization type in the device included in the receiver antenna polarization types in the device.

10. The device of claim 9, wherein the transmitted data comprises an indication of the selected transmitter antenna polarization type for the second device.

11. The device of claim 8, wherein the number of receiver antenna polarization types in the second device is determined based on information obtained following the broadcasting, wherein each broadcast interval comprises at least one of the transmitter antenna polarization types.

12. The device of claim 8, wherein the instructions, when executed by the at least one processor, cause the device to:
receive a second indication of a second transmitter antenna polarization type in the device included in the number of transmitter antenna polarization types in the device; and
transmit second data using the indicated second transmitter antenna polarization type.

13. The device of claim 8, wherein a communication between the device and the second device is based on millimeter electromagnetic (EM) waves and a carrier frequency associated with the millimeter wave band.

14. A system comprising:
a first device configured to periodically broadcast transmitter antenna polarization types in the first device during a pre-networking stage before a second device establishes an association with the first device and to transmit to a second device a plurality of data units based on a first number of transmitter antenna polarization types in the first device and a second number of receiver antenna polarization types in the second device; and
the second device configured to, during the pre-networking stage:
receive the plurality of data units,
select a transmitter antenna polarization type for the first device and a receiver antenna polarization type for the second device based on an evaluation of a performance of a communication link between the first device and the second device for each of the plurality of data units, and
transmit an indication of the selected transmitter antenna polarization type for the first device to the first device,
wherein the second device is configured to receive each of the plurality of data units a total number of times that is based upon a multiplication of the first number and the second number, and
wherein the second device is configured to receive each of the plurality of data units using each of the receiver antenna polarization types in the second device.

15. The system of claim 14, wherein the first device is configured to transmit data using the selected transmitter antenna polarization type for the first device, and wherein the second device is configured to receive the data using the selected receiver antenna polarization type for the second device.

16. The system of claim 14, wherein the performance evaluation for each of the plurality of data units is based on at least one of a received signal strength indication (RSSI), a signal to noise ratio (SNR), and a bit error rate (BER).

17. The system of claim 14, wherein the second device is configured to transmit to the first device a second plurality of data units based on a number of transmitter antenna polarization types in the second device and a number of receiver antenna polarization types in the first device, and wherein the first device is configured to receive the second plurality of data units, select a transmitter antenna polarization type for the second device and a receiver antenna polarization type for the first device based on an evaluation of a performance of the communication link between the first device and the second device for each of the second plurality of data units, and transmit an indication of the selected transmitter antenna polarization type for the second device to the second device.

18. The system of claim 17, wherein the second device is configured to transmit data using the selected transmitter antenna polarization type for the second device, and wherein the first device is configured to receive the data using the selected receiver antenna polarization type for the first device.

19. The system of claim 14, wherein the plurality of data units is based on a number of transmitter antenna directional patterns in the first device and a number of receiver antenna directional patterns in the second device.

20. The method of claim 1, wherein the constructed number of data units is further based upon a multiplication of a third number of receiver antenna polarization types in the second device and a fourth number of receiver directional patterns in the second device.

21. The device of claim 8, wherein the constructed number of data units is further based upon a multiplication of a third number of antenna polarization types in a receiving device and a fourth number of directional patterns in the receiving device.

22. The system of claim 14, wherein the total number of times is further based upon a multiplication of a third number of transmitter directional patterns in the first device and a fourth number of receiver directional patterns in the second device.

* * * * *